United States Patent [19]
Paff

[11] Patent Number: 5,526,133
[45] Date of Patent: Jun. 11, 1996

[54] SYSTEM AND METHOD FOR LOGGING AND RETRIEVING INFORMATION ON VIDEO CASSETTES IN A COMPUTER CONTROLLED SURVEILLANCE SYSTEM

[75] Inventor: Robert Paff, Boca Raton, Fla.

[73] Assignee: Sensormatic Electronics Corporation, Deerfield Beach, Fla.

[21] Appl. No.: 267,423

[22] Filed: Jun. 28, 1994

[51] Int. Cl.⁶ .............................. H04N 5/76; G11B 27/02
[52] U.S. Cl. ........................ 358/335; 348/153; 348/159; 358/311; 360/14.3; 360/69; 360/72.1
[58] Field of Search .............................. 360/72.1, 69, 13, 360/14.1, 14.2, 14.3; 358/311, 335; 348/149, 150–153, 143, 159

[56] References Cited

U.S. PATENT DOCUMENTS

| | | | |
|---|---|---|---|
| 3,811,008 | 5/1974 | Lee | 178/6.6 |
| 4,074,225 | 2/1978 | Vandeweghe | 340/237 |
| 4,237,483 | 12/1980 | Clever | 358/180 |
| 4,511,886 | 4/1985 | Rodriguez | 340/534 |
| 4,729,044 | 3/1988 | Kiesel | 360/14.3 |
| 4,777,526 | 10/1988 | Saitoh et al. | 358/108 |
| 4,814,869 | 3/1989 | Oliver, Jr. | 358/108 |
| 4,942,464 | 7/1990 | Milatz | 358/108 |
| 4,962,473 | 10/1990 | Crain | 364/900 |
| 4,992,866 | 2/1991 | Morgan | 348/159 |
| 5,095,196 | 3/1992 | Miyata | 235/382 |
| 5,179,449 | 1/1993 | Dol | 358/311 |
| 5,218,672 | 1/1993 | Morgan et al. | 360/14.3 |
| 5,339,393 | 8/1994 | Duffy et al. | 360/14.2 |
| 5,446,002 | 8/1995 | Adams et al. | 360/72.2 |

OTHER PUBLICATIONS

Proceedings 1987 Carnahan Conference on Security Technology: Electronics Crime Countermeasures, Jul. 15–17, 1987.

*Primary Examiner*—Tommy P. Chin
*Assistant Examiner*—Luanne P. Din
*Attorney, Agent, or Firm*—Robin, Blecker, Daley & Driscoll

[57] ABSTRACT

A method and system for use in a computer controlled video surveillance system are disclosed for storing and retrieving data relating to information recorded on a video tape, thereby locating visual information recorded on a video tape. The system comprises means for recording visual information on a plurality of segments of a video tape, each of the segments being defined by a time at which its recording begins and a time at which its recording ends. Means are provided for recording a tape identification code on the plurality of segments of the video tape. A tape counter generates a tape count such that for each segment, a corresponding initial tape count is generated at the time when recording of that segment begins. The invention further comprises a database. Stored in the database is a log corresponding to the video tape. The log comprises a record relating to each segment. Each record contains searchable fields. One of the fields contains the initial tape counts corresponding to the segment to which the record relates. Means are provided for communicating the tape count to the database. The method has the following steps: generating an identification for identifying the tape; recording the identification code at a plurality of locations on the tape; recording visual information on a plurality of segments of the tape; generating an initial tape count when the recording of the visual information starts; generating an end tape count when the recording of the visual information ends. Each of the segments of the tape are defined by reference to the tape count when the recording of the visual information on that segment starts and the tape count when the recording of the visual information on that segment ends. The method further includes generating a log in a database such that the log is associated with the video tape. The log is stored in the database with reference to the identification code for the tape and the log contains a plurality of records each respectively corresponding to each of the plurality of segments of the tape. Each record contains searchable fields. One of the fields contains the initial tape count. In order to locate the visual information on particular segment of the tape, the fields of the records are searched.

17 Claims, 3 Drawing Sheets

SYSTEM AND METHOD FOR LOGGING AND RETRIEVING INFORMATION ON VIDEO CASSETTES IN A COMPUTER CONTROLLED SURVEILLANCE SYSTEM

BACKGROUND

1. Field of the Invention

The present invention relates generally to the field of electronic surveillance systems. More specifically, it relates to a system and method for tracking data recorded at various locations on a plurality of video tapes recorded by a video tape recorder as part of a surveillance system.

2. Discussion of the Prior Art

Video surveillance systems are commonly used in airports, casinos, stores and factories in order to monitor a large number of locations simultaneously. Such systems typically include a plurality of video cameras, video monitors for displaying the outputs of the video cameras and devices for remotely controlling the video cameras. More sophisticated video surveillance systems may include a computer for controlling the various components from a remote location. A detailed description of such a video surveillance system is contained in copending United States patent application Ser. No. 08/166,599 which is incorporated herein by reference.

It is also common for such video surveillance systems to include one or more video tape recorders for recording the outputs of the video cameras. The recording of the output of any particular video camera in the system may be triggered by a security operator or by the occurrence of an alarm event such as a break-in or the operation of a timer. In any event, during the course of monitoring large premises such as casinos or airports, it is possible for a large number of events to be recorded on many video cassettes.

In order to keep track of the contents of video cassettes in surveillance systems of the prior art, the operator had to keep a log of the location, on each video cassette, of video tape segments containing particular pieces of information. For example, when recording of a segment of a particular video tape in the system commenced, it was customary for the operator to make a note of the time and date of the recording, the tape count at the start of the recording or a description of the recorded event so that the segment of the tape could be retrieved at a later time. The operator also would make a note of the video cassette being used. A log of the contents of the cassette could thus be developed. In order to view any particular segment of a video tape, the operator had to search the entries in the log to find the data identifying the recorded event. The corresponding tape count and hence the desired tape segment could then be found. Alternatively, the tape could be played back and fast forwarded or rewound until the desired segment was found. It was therefore very cumbersome to keep track of the contents of a large number of events recorded on various video cassettes in a video surveillance system.

The present invention is therefore directed towards providing a method and apparatus for logging and retrieving information on video cassettes used in a surveillance system.

SUMMARY OF THE INVENTION

The present invention is a method of locating visual information recorded on a video tape for use in a computer controlled video surveillance system. The method has the following steps: generating an identification code for identifying the tape; recording the identification code at a plurality of locations on the tape; recording visual information on a plurality of segments of the tape; generating an initial tape count when the recording of the visual information starts; and generating an end tape count when the recording of the visual information ends. Each of the segments of the tape are defined by reference to the initial tape count and the end tape count. The method further includes using a computer to generate a log in a database such that the log is associated with the video tape. The log is stored in the database with reference to the identification code for the tape and the log contains a plurality of records each respectively corresponding to each of the plurality of segments of the tape. Each record contains searchable fields. One of the fields contains the tape count when the recording of the visual information of the corresponding segment started. In order to locate the visual information on particular segment of the tape, the fields of the records are searched.

The invention also includes a system for storing and retrieving data relating to information recorded on a video tape. The system comprises means for recording visual information on a plurality of segments of a video tape, each of the segments being defined by a time at which its recording begins and a time at which its recording ends. Means are provided for recording a tape identification code on the plurality of segments of the video tape. A tape counter generates a tape count such that for each segment, a corresponding initial tape count is generated at the time when recording of that segment begins. The invention further comprises a database. Stored in the database is a log corresponding to the video tape. The log comprises a record relating to each segment. Each record contains searchable fields. One of the fields contains the initial tape counts corresponding to the segment to which the record relates. Means are provided for communicating the tape count to the database.

DETAILED DESCRIPTION

The following is a description of a preferred embodiment of the invention. It is intended to illustrate the invention and not to limit it. The full scope of the invention is to be determined by the appended claims and their equivalents.

Figure 1:
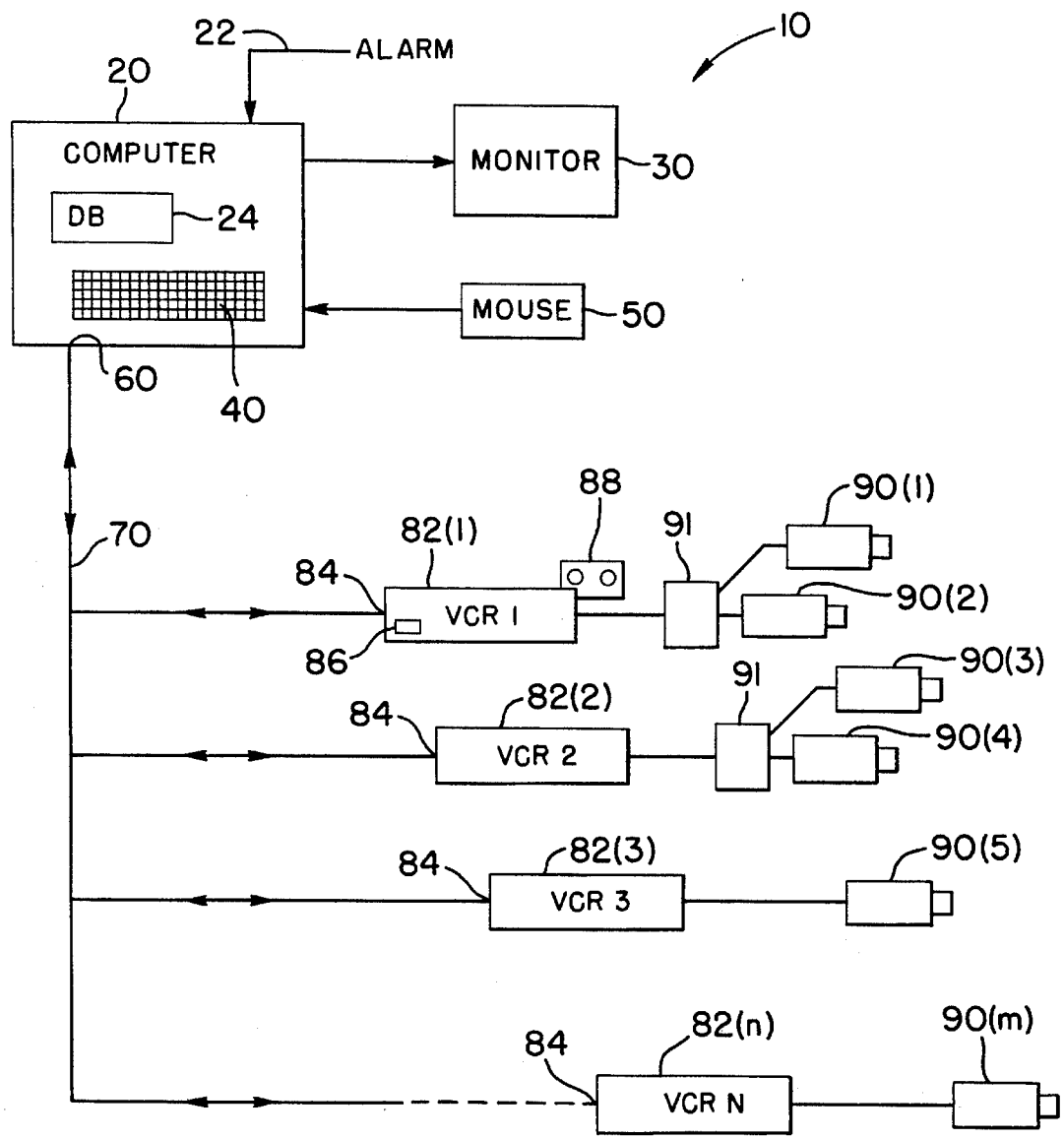
FIG. 1 is a block diagram of a system of the present invention.

A computer controlled video surveillance system of the present invention is shown in block diagram form in FIG. 1. System 10 is controlled by computer 20 which has a monitor 30, input devices in the form of keyboard 40 and a mouse-type input device 50. The term "mouse-type input device" is taken to encompass a mouse, track-ball and equivalent pointing devices. A database 24 is included in computer 20. Computer 20 is also provided with an RS232 communications port 60 which is connected to data bus 70. While an RS232 port is preferred, protocols other than RS232 can be used. Computer 20 is preferably a Macintosh II personal computer.

Data bus 70 links computer 20 to a plurality of video cassette recorders (VCR's) comprising VCR's 82(1)–(n). Since VCR's 82(1)–(n) are substantially identical, only one will be described and referred to generically as VCR 82. Each VCR 82 has an RS232 port 84 which is connected to bus 70. VCR 82 has all the functions of a conventional VCR (e.g. the ability to record, play, fast forward, rewind, freeze frame etc.). Those functions can be controlled by means of buttons on a control panel on the VCR or by means of mouse 50. All of those functions can be controlled by providing commands to VCR 82 through RS232 port 84. VCR 82 has a tape counter 86 which generates a tape count which advances as the tape advances. The tape count is output by VCR 82 to data bus 70 via output port 84 so that it can be communicated to computer 20. The preferred VCR is the Panasonic No. AG-6730.

In order to monitor a plurality of locations, the system includes a plurality of video cameras 90(1)–(m). Each video camera is assigned an address for identification. In FIG. 1 each video camera 90 is connected to a VCR 82. Multiple cameras may be connected to a single VCR via video switcher or video splitter 91.

Computer 20 is programmed such that it can instruct any of the VCR's 82 to start or stop recording in response to the occurrence of various triggering events. For example, computer 20 is programmed to generate a signal to trigger recording if the operator instructs it to do so, if an alarm signal is generated on alarm line 22 (for example a fire alarm or a break-in alarm) or if a timer is set in the computer to record at a predetermined time. Computer 20 is programmed to store the time and date and the nature of each triggering event (user input, alarm or timer). Computer 20 is also programmed to store the identification code of the camera which is supplying visual information to VCR 82 so that the source of the video signal (one of cameras 90) can be logged when recording commences.

Figure 4:
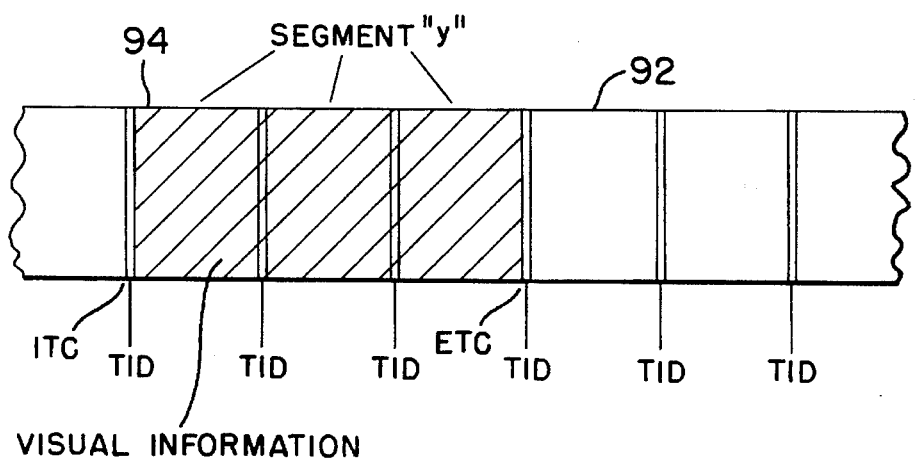
FIG. 4 is a diagram of a section of the video tape used in the present invention.
Figure 5:
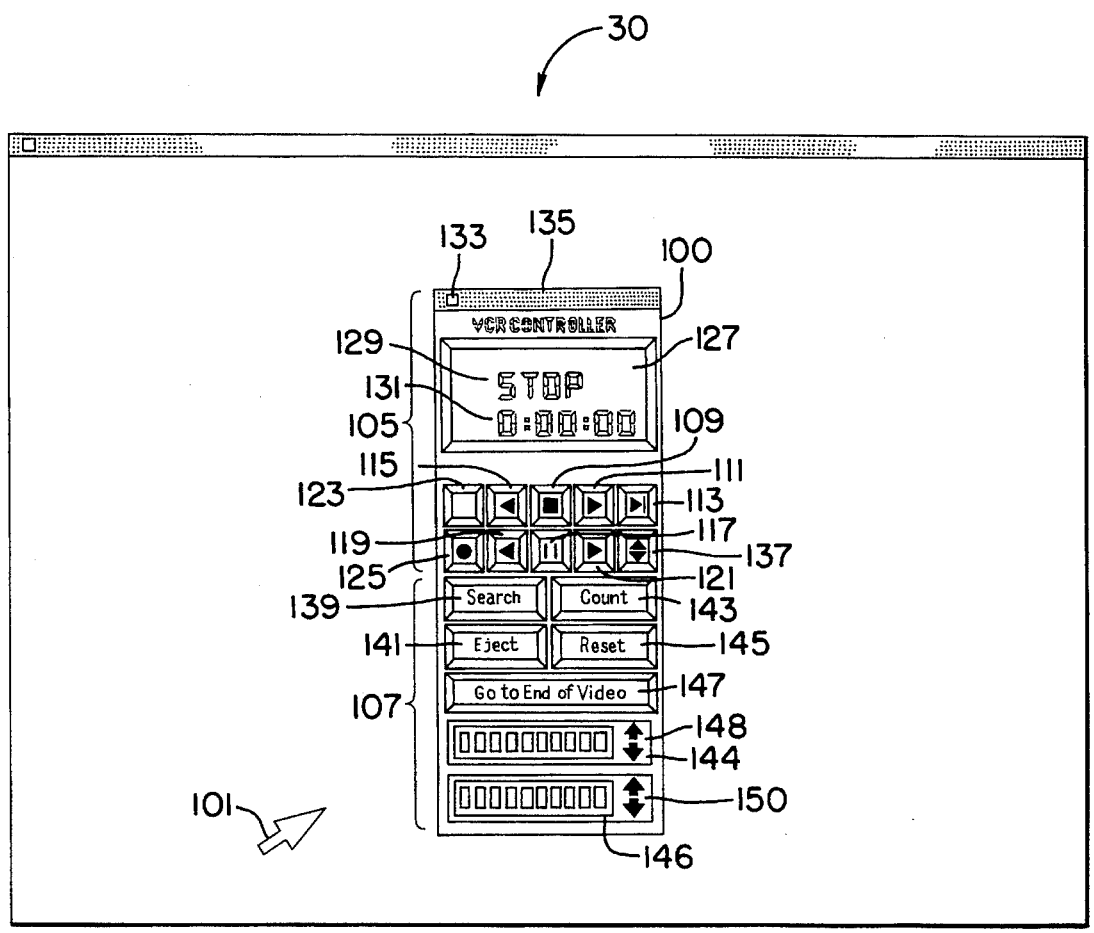
FIG. 5 is a diagram of the control palette for controlling the video cassette recorder of the present invention.

Prior to recording, the system is set up for a particular video cassette 88, referred to as video cassette "x". The video cassette contains a length of tape 92 (FIG. 4). Computer 20 generates a tape identification code (TID) which is assigned to the particular video cassette x. The TID can also be input by the operator. In that event, the computer checks that the TID selected by the user is not the same as an existing TID already stored in the computer. The TID for the particular cassette is communicated by computer 20 to VCR 82 along bus 70. VCR receives the TID and records it at the start of tape 92 and thereafter at regular intervals, preferably at every frame of tape 92 during the process of recording visual information on the tape. The TID is therefore recorded at a plurality of locations along tape 92. In addition to recording the TID on the tape, VCR 82 can also read a TID off the tape and communicate it to computer 20 via data bus 70. Since the TID is recorded at intervals throughout the tape, the tape can easily be identified by placing it in VCR 82 and playing it for a few seconds regardless of the extent to which the tape has been played or rewound. There is therefore no need to rewind it in order to ascertain its TID.

Figure 2:
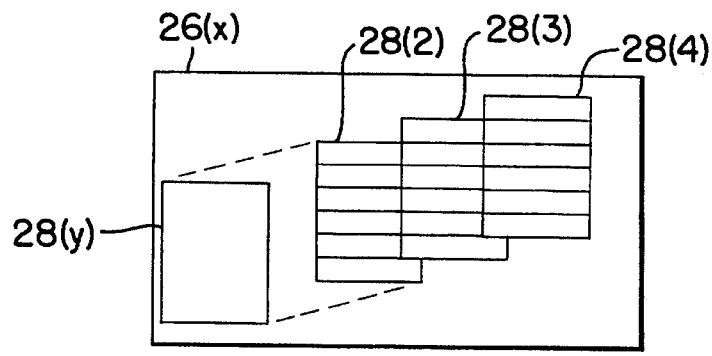
FIG. 2 is a schematic illustration of the contents of the database used in the present invention.

Database 24 is arranged such that it contains a plurality of logs 26(x) (where x=1 to the number of tapes). Thus, for each tape there exists a log 26(x) in database 24 as shown in FIG. 2. When a new tape "x" is to be used, computer 20 automatically creates a new log 26(x) for that tape.

Each time the VCR starts recording on a specific tape, a new segment "y" of that tape is commenced by the VCR.

Figure 3:
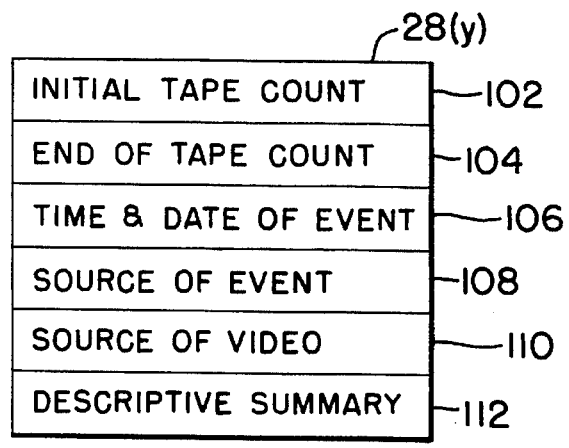
FIG. 3 is a schematic illustration of the contents of a subrecord of the present invention.

Segment "y" ends when the recording stops. Each log 26(x) is thus made up of a number of records 28(y), where y=1 to the number of segments defined on tape "x". Thus, each segment of each tape has a data record 28(y) relating to it. Each record 28(y) is divided into a number of fields which will be described in detail. FIG. 3 shows the fields in a typical record 28(y) in greater detail.

When a cassette "x" is inserted into VCR 82, VCR 82 reads an area on tape 92 reserved for the TID and communicates the TID to computer 20. If no TID is found, computer 20 generates a TID and a new log 26(x) for cassette "x". If the tape has a TID but no log 26(x) exists for the cassette "x", computer 20 creates a log for it. The creation of a log can be done automatically or by prompting the operator to enter a TID. When recording commences, VCR 82 stores the TID on tape 92 at every frame as visual information is recorded as described above.

When recording of visual information starts, VCR 82 notes the initial tape count on counter 86 (the "ITC") and transmits this to computer 20 where it is stored on the tape log for that tape. The ITC defines the start of a segment on tape 92. For a particular tape "x", having a segment "y", an ITC is stored in field 102 of sub-record 28(y) in log 26(x) (See FIGS. 2 & 3). Additionally, at the start of the recording, computer 20 stores, in appropriate records in database 24, further information relating to conditions prevailing when the segment of tape 84 is recorded. The term "conditions" includes, the time and date of recording, the source of the recorded images, the event which caused recording to start and other user input information. Thus, when an event occurs which causes computer 20 to instruct VCR 82 to start recording, the time and date of the event which caused the recording to commence is stored in field 106 and the source of the event (alarm, user input or timer) is stored in field 108. The source of the video signal (i.e. address of video camera 90) is stored in field 110. On commencement of recording, computer 20 also generates a signal which prompts the operator to enter by means of keyboard 40, a brief descriptive summary of the subject matter of the recording. The operator can enter the summary at the time of recording or at a later time by calling up the appropriate log. The summary is stored in field 112.

As recording proceeds, VCR 82 advances tape counter 86. Recording may be terminated by the operator or as a result of a timer signal generated by computer 20 at the end of a predetermined time period. On receipt of a signal to terminate recording, computer 20 generates an end of recording signal which it transmits to VCR 82 along bus 70. On receipt of the end of recording signal, VCR 82 stops tape counter 84 and sends its end of tape count ("ETC") to computer 20 which stores ETC in field 104. The ETC defines the end of the segment on tape 84. Thus, each segment on tape 92 is defined by an ITC and an ETC.

Each time a new recording instruction is received from the user, a timer or an alarm, the process is repeated. As a result of the successive repetition of the above process, tape 92 is divided into segments 94 each defined by an ITC and ETC. Thus, for each segment "y" of tape "x" containing visual information recorded in a particular time interval, there is a corresponding record 28(y) within log 26(x).

The use of the invention for finding a particular image on a video tape will now be described. Since each tape "x" has an identifying code TID, the user can call up the log 26(x) pertaining to that tape from database 24 by inputting the TID into computer 20. The log 26(x) for tape "x" having been located, the user can browse or search the records log 26(x)

until the desired record 28(y) (and hence the desired segment) is found. To that end, database 24 is also provided with the ability to search by field. For example, if the user knows information relating to conditions at the time of recording of a segment, he or she can search for those conditions in record 26 or log 28. The user can thus search for a field using the time and date of the event which caused a segment to be recorded, the source of the triggering event, the source of the video input or the terms in the descriptive summary as search criteria. When the desired entry in the log is found, the operator uses the computer to instruct the VCR to find the segment at the starting point noted in the log. The VCR then searches for and plays the desired video segment. Thus, using the search criteria, computer 20 will quickly locate the record 28(y) and hence a particular segment "y". The ability of the computer to automatically find a video segment on the VCR tape is a significant benefit to the operator in that s/he does not have to spend the considerable time that it would take to perform the search manually.

Another way of locating a particular segment "y" on a particular tape is to insert the tape into VCR 82 for playback. VCR 82 reads the TID off the tape and sends the TID to computer 20 along bus 70. This informs computer 20 of the identity of the particular tape. Computer 20 thus locates the appropriate log 26(x) in database 24. Since TID is recorded at every frame, the position of tape 92 (i.e. the extent to which it has been rewound or forwarded) does not matter. Having found the log for tape "x", the operator can search the contents of the log using any of the fields as search criteria or by browsing as described above. Once a particular record 28(y) is found in database 24, the computer can instruct VCR 82 to go to a particular segment on tape 92 defined by a particular tape count. VCR 82 then advances or rewinds tape 84 to the segment "y" to which record 28(y) relates.

A further feature of the present invention is the ability to control the operation of VCR 82 by means of instructions from computer 20. The following is a description of the system for controlling the operation of VCR 82. Computer 20 is programmed such that it produces a display in the form of control palette 100 on monitor 30. Control palette 100 includes a plurality of icons in the form of "buttons", each of which controls one of the functions of VCR 82. Control palette 100 is in the form of a "window" generated by computer 20. In order to activate any of the buttons, the operator uses mouse 50 to point at the desired button and clicks on that button. Computer 20 receives the instruction from mouse 50 and generates an appropriate control signal which is sent to VCR 82 along data bus 70. Thus the interaction of the user with the icons using mouse 50 allows VCR 82 to be controlled. Palette 100 is made up of first part 105 and second part 107.

The following icons are provided in first part 105: stop button 109—stops the tape; play button 111—starts playing the tape and plays the tape in a selected mode (described below); fast forward button 113—fast forwards the tape towards the end of the tape; rewind button 115—rewinds towards the beginning of the tape; pause button 117—in the play mode, stops the tape and displays the current video frame; frame reverse button 119—in pause mode, steps the tape back one video frame; frame forward button 121—in the pause mode, steps the tape back one video frame; time lapse record button 123—starts recording in a selected mode (described below); real time record button 125— starts recording.

Palette 100 is also provided with a "display" section 127 which is made up of two displays 129 and 131. One display, 129, displays the currently selected function (e.g. stop, play, fast forward, pause etc.). The other display 131 displays the tape count output by tape counter 86 of VCR 82 in hours, minutes and seconds. Since it is in the form of a window, palette 100 has a "close" button 133 which allows the operator to close palette 100 so that it no longer appears on monitor 30. Additionally, palette 100 has a drag bar 135 which allows the operator to move palette 100 to various locations in the identical way in which a window is dragged and dropped in a conventional Macintosh computer system.

Second part 107 of palette 100 can be selectively displayed by clicking on open/close button 137. Clicking on open/close button 137 causes second part 107 to open and thus the following buttons to appear: search button 139 opens a window allowing the operator to enter a time, thus causing computer 20 to instruct VCR 82 to search for a frame recorded at the entered time; eject button 141 causes the tape to be ejected from VCR 82; count button 143 updates counter display 131 to reflect the current output of tape counter 86; reset tape count button 145 resets tape counter 84; and go-to-end-of-video button 147 positions the tape at the end of the last recorded segment.

Also provided in second part 102 of palette 100 are play mode lapse selector/indicator 144 and record mode selector/indicator 146. These controls are operated by pointing cursor 101 at the up or down arrows 148 or 150 and clicking the mouse on them. VCR 82 can be operated in various play or record modes. In "time lapse" mode, the tape runs at slow speed, giving a time lapse effect. The tape can also run in "normal" mode at various speeds. When recording, the VCR 82 can be set to run in time lapse mode using record mode selector/indicator 146. This provides images sampled every few seconds. If an alarm event occurs, VCR 82 can be switched manually or automatically into normal mode, thus providing normal video images. When the alarm event is over, VCR 82 can be switched back to time lapse mode. Play mode selector/indicator 144 is used to select the play mode so that the tape can be viewed in the mode in which it was recorded or in a different mode (faster or slower than the record mode).

I claim:
1. For use in a computer controlled video surveillance system, a method of locating visual information recorded on a video tape, the method comprising the steps of:

generating an identification code for identifying the tape;

recording the identification code at a plurality of locations on the tape;

recording visual information on a plurality of segments of the tape;

generating an initial tape count when the recording of the visual information starts;

generating an end tape count when the recording of the visual information ends;

wherein each of the segments of the tape is defined by the initial tape count and the end tape count;

generating a log by means of a computer, the log being stored in a database with reference to the identification code for the tape and the log comprising a plurality of records each respectively corresponding to each of the plurality of segments of the tape, each record comprising computer searchable fields, one of the fields of each record containing the tape count when the recording of the visual information of the corresponding segment started;

searching the fields to locate a particular field.

2. The method of claim 1 wherein the step of recording the visual information on a particular segment of the tape is started in response to an event, and further comprising the step of entering information relating to the event into a field in the record corresponding to the particular segment.

3. The method of claim 2 wherein the event is an alarm being generated.

4. The method of claim 2 wherein the event is generation of a timer signal at a predetermined time.

5. The method of claim 2 wherein the event is generation of a user triggered signal.

6. The method of claim 2 wherein the step of entering information into a field in the record comprises entering the time at which the visual information was recorded.

7. The method of claim 2 wherein the step of entering information into a field in the record comprises entering a description of the event.

8. The method of claim 1 wherein the visual information recorded on a particular segment of the tape is provided by one of a plurality of video cameras and further comprising the steps of:

assigning an address to each camera of a plurality of video cameras;

entering into a field in the record for the particular segment of the tape, the address assigned to the camera which provided the plurality of images recorded on the particular segment of the tape.

9. A system for storing and retrieving data relating to information recorded on a video tape, the system comprising:

means for recording visual information on a plurality of segments of a video tape, each of the segments being defined by a time at which its recording begins and a time at which its recording ends;

means for recording a tape identification code at intervals on the video tape to identify the tape;

means for generating a tape count such that for each segment, a corresponding initial tape count is generated at the time when recording of that segment begins;

a database comprising a log corresponding to the video tape, the log comprising a plurality of records each respectively corresponding to each of the plurality of segments, each record comprising searchable fields and one of the fields in each record containing the initial tape count of the segment to which that record corresponds;

means for communicating the tape count to the database.

10. The system of claim 9 wherein the means for generating a tape count is such that for each segment a corresponding end tape count is generated at the time when recording of that segment ends, and further wherein one of the fields in the record to which that segment corresponds contains the end tape count for that segment.

11. The system of claim 9 wherein the record relating to a segment includes fields containing information relating to conditions at the time of recording of that segment.

12. The system of claim 11 wherein the information relating to conditions at the time of recording of a segment includes the time at which recording of that segment began.

13. The system of claim 12 wherein the information relating to conditions at the time of recording a segment includes the time at which recording of that segment ends.

14. The system of claim 12 further comprising an input device and wherein the information relating to conditions at the time of recording of a segment includes text input by an operator using the input device.

15. The system of claim 12 further comprising means for generating a triggering signal to cause the means for recording to start recording, the signal being generated in response to one of a plurality of events and wherein the information relating to conditions at the time of recording of a segment includes information relating to the event in response to which the triggering signal was generated.

16. The system of claim 11 further comprising:

a plurality of sources of video signals connected to the means for recording;

means for generating information identifying the sources of video signals; and wherein the information relating to conditions at the time of recording includes the information identifying the source of video signals.

17. The system of claim 11 wherein the records in the database is searchable by reference to the information relating to conditions at the time of recording of the segments.

* * * * *

UNITED STATES PATENT AND TRADEMARK OFFICE
CERTIFICATE OF CORRECTION

PATENT NO. : 5,526,133
DATED      : June 11, 1996
INVENTOR(S) : Robert Paff

It is certified that error appears in the above-indentified patent and that said Letters Patent is hereby corrected as shown below:

On the cover page, Item [57], delete lines 1-39 and insert:

-- A method and system for use in a computer controlled video surveillance system comprises recorder for recording visual information on a plurality of segments of a video tape, each of the segments being defined by a time at which its recording begins and a time at which its recording ends. The system provide for recording a tape identification code on the plurality of segments of the video tape. A tape counter generates a tape count such that for each segment, a corresponding initial tape count is generated at the time when recording of that segment begins. A log corresponding to the video tape is stored in a database. The log comprises a record relating to each segment. Each record contains searchable fields. One of the fields contains the initial tape counts corresponding to the segment to which the record relates. Input/Output ports are provided for communicating the tape count to the database with reference to the identification code for the tape. The log contains a plurality of records each respectively corresponding to each of the plurality of segments of the tape. Each record contains searchable fields. One of the fields contains the initial tape count. In order to locate the visual information on particular segments of the tape, the fields of the records are searched. --

Signed and Sealed this

Fourth Day of February, 1997

*Attest:*

BRUCE LEHMAN

*Attesting Officer*   Commissioner of Patents and Trademarks